(12) United States Patent
Luo et al.

(10) Patent No.: US 12,483,873 B2
(45) Date of Patent: Nov. 25, 2025

(54) WIRELESS SERVICE DISCOVERY METHODS, DEVICES AND SYSTEMS

(71) Applicant: Cypress Semiconductor Corporation, San Jose, CA (US)

(72) Inventors: Hui Luo, Marlboro, NJ (US); Kameswara Medapalli, Saratoga, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 389 days.

(21) Appl. No.: 18/175,406

(22) Filed: Feb. 27, 2023

(65) Prior Publication Data
US 2024/0292202 A1    Aug. 29, 2024

(51) Int. Cl.
| | | |
|---|---|---|
| *H04W 4/00* | (2018.01) | |
| *H04W 8/00* | (2009.01) | |
| *H04W 12/069* | (2021.01) | |
| *H04W 48/16* | (2009.01) | |
| *H04W 84/12* | (2009.01) | |

(52) U.S. Cl.
CPC ......... *H04W 8/005* (2013.01); *H04W 12/069* (2021.01); *H04W 48/16* (2013.01); *H04W 84/12* (2013.01)

(58) Field of Classification Search
CPC ..... H04W 8/005; H04W 8/00; H04W 12/069; H04W 48/16; H04W 84/12
USPC .......................................................... 370/329
See application file for complete search history.

(56) References Cited

U.S. PATENT DOCUMENTS

| | | | | |
|---|---|---|---|---|
| 9,468,033 | B2 * | 10/2016 | Naqvi | H04L 67/146 |
| 9,544,376 | B1 * | 1/2017 | Lambert | H04W 48/16 |
| 12,137,383 | B2 * | 11/2024 | Scahill | H04W 24/10 |
| 2011/0211219 | A1 * | 9/2011 | Bradley | G06F 3/12 |
| | | | | 358/1.15 |
| 2012/0058728 | A1 * | 3/2012 | Wang | H04W 72/542 |
| | | | | 455/62 |
| 2014/0112327 | A1 * | 4/2014 | Calcev | H04W 48/14 |
| | | | | 370/338 |
| 2014/0254362 | A1 * | 9/2014 | Ganu | H04W 16/08 |
| | | | | 370/230 |
| 2015/0195845 | A1 * | 7/2015 | Wang | H04W 72/542 |
| | | | | 370/252 |
| 2016/0080962 | A1 * | 3/2016 | Harris | H04W 4/16 |
| | | | | 370/252 |
| 2016/0323925 | A1 * | 11/2016 | Alanen | H04W 8/005 |
| 2016/0353269 | A1 * | 12/2016 | Kasslin | H04L 67/303 |
| 2017/0006117 | A1 * | 1/2017 | Kafle | H04L 65/612 |

* cited by examiner

*Primary Examiner* — Marceau Milord

(57) ABSTRACT

A method can include, by operation of a wireless device, determining at least one set of wireless channel candidates from available wireless channels of at least one wireless standard; determining a network information value accessible to devices of a wireless network; generating a selection value with an arithmetic-logic operation on the network information value; selecting a plurality of wireless channels from the at least one set of wireless channel candidates with the selection value to determine a discovery wireless channel set; and transmitting or receiving on all channels of the discovery wireless channel set in a wireless network discovery operation for the wireless network. Corresponding devices and systems are also disclosed.

20 Claims, 8 Drawing Sheets

WIRELESS SERVICE DISCOVERY METHODS, DEVICES AND SYSTEMS

TECHNICAL FIELD

The present disclosure relates generally to wireless systems, and more particular to discovery methods by which a wireless device can discover and possibly join a wireless network.

BACKGROUND

Adding a wireless devices to a network can include the execution of a discovery protocol that dictates how the presence of a network can be determined. Popular Wi-Fi service discovery protocols, such as Wi-Fi Aware and Wi-Fi Easy Connect, identify a limited number of "social" channels as default/preferred channels to initialize communications between Wi-Fi devices. However, the use of a few fixed channels does not appear to be sufficient to sustain the growth of Wi-Fi devices, especially the ever increasing number of IoT (Internet-of-Things) devices.

The current Wi-Fi Aware protocol requires every cluster to have a DW (Discovery Window) lasting 16 TU (Time Unit, 1024 us) for every 512 TU on social channels for transmitting a cluster beacon frame, SDF (Service Discovery Frame), and NAF (NAN Action Frame) lasting 200-400 us. Further, every NAN (Neighbor Aware Networking) STA (station) can be limited to the transfer of one SDF or NAF per DW, on average, to avoid jamming the social channels. When unsynchronized service discovery is used, a device in the Publisher role may send Publish messages (service information) on the social channel (default Publish channel) for N*100 TU with N being random between 5 and 10 in each channel iteration.

The current Wi-Fi Easy Connect protocol (DPP) uses a social channel as a "preferred" channel if the channel or channel list are not contained in bootstrapping information.

A drawback to conventional discovery protocols can be performance degradation as the number of network devices increases. For example, in the case of Wi-Fi Aware service discovery inside a DW, social channel congestion is not severe if there are less than 32 devices. However, the subsequent service discovery protocol could be very slow because each device on average can only transmit one frame every 512 TU. In the case of unsynchronized service discovery, the congestion on social channel could be heavy if all devices use a same default Publish channel (required by a default setup process).

In the case of Wi-Fi Easy Connection protocol, there can be a large number of enrollees waiting for being discovered and configured, thus potentially generating a lot of DPP messages for discovery purposes, such as presence announcement messages on the social channel.

It would be desirable to arrive at some way of improving device discovery methods, particularly for those networks having a relatively large number of devices, such as networks for IoT devices.

SUMMARY

Embodiments can include wireless devices determining sets of wireless channel candidates from available wireless channels of a wireless network. A network information value can be determined that is known as a prior knowledge, such as a service name or as knowledge accessible to devices of the wireless system without the discovery effort, such as a bootstrapping public key that can be read from a QR code or other out-of-band method. A selection value can be generated with an arithmetic-logic operation that uses the network information value. Devices can commonly select a plurality of channels from the sets of wireless channel candidates using the selection value to determine a discovery wireless channel set. Communications can be transmitted and/or received on all channels of the discovery wireless channel set in a wireless network discovery operation for the wireless network.

DETAILED DESCRIPTION

According to embodiments, an arithmetic-logic function, such as a hash function, can operate on network information commonly known to wireless devices, to generate a default operating channel for service discovery between the two devices. Such generated channel values can be used in lieu of social channels, allowing rapid discovery operations without overtaxing any single (i.e., social) channel.

In some embodiments, network information can include a service name for a network. In some embodiments, network information can include a bootstrapping public key.

In some embodiments, sequence of hash function operations (e.g., a hash chain) can be used to generate default channels for discovery operations of a wireless network.

Figure 1:
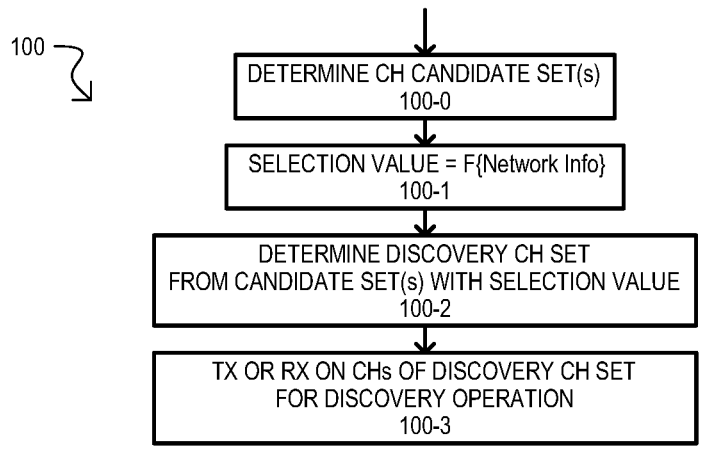
FIG. 1 is a flow diagram of a method according to an embodiment.

FIG. 1 is a flow diagram of a method 100 according to an embodiment. A method 100 can be executed by multiple devices to arrive a matching set of wireless channels (a discovery channel set) that can be commonly used by devices in a wireless service discovery operation. It is noted such wireless channels are generated with a computation operation (e.g., hash function), in sharp contrast to conventional approaches which can have one or two assigned channels (i.e., social channels) for discovery operation.

A method 100 can include determining one or more channel candidate sets 100-0. Such an action can include selecting channels from one or more operating bands (e.g., ISM bands at 2.4 GHZ, 5 GHZ, 6 GHZ). In some embodiments, such channels can be non-overlapping channels of the band (including channel that end on a same frequency where the next channel starts). However, other embodiments can include selecting channels in a different fashion or including all channels of a band. It is understood that all devices involved in discovery operations have, or arrive at, a same channel candidate set(s) through a computation operation.

A method 100 can generate a selection value that is a function of a network information value 100-1. As note herein, such a function can include a hash function, including a hash function already included in a device for other purposes (e.g., SHA256). However, it is understood that all devices involved in discovery operations use a same function. Using the selection value, a method 100 can determine a discovery channel set 100-2. In some embodiments, a resulting magnitude of a selection value, as compared to a maximum possible value, can be used (e.g., a percent)

A method 100 can then, depending upon the role it is playing in a network, transmit or receive on the channels of the discovery set 100-3. Accordingly, a device can act as a publisher (or enroller, advertiser) or can act as a subscriber (or enrollee, scanner). Such an action can include transmitting/receiving over multiple discovery channels sequentially and/or on multiple discovery channels at the same time.

In this way, rather than rely on a limited number of assigned (e.g., default) social channels, wireless devices can arrive different and/or larger numbers of channels for discovery operations using an operation, such has a hash function, on a network value commonly known to both devices.

Figure 2:
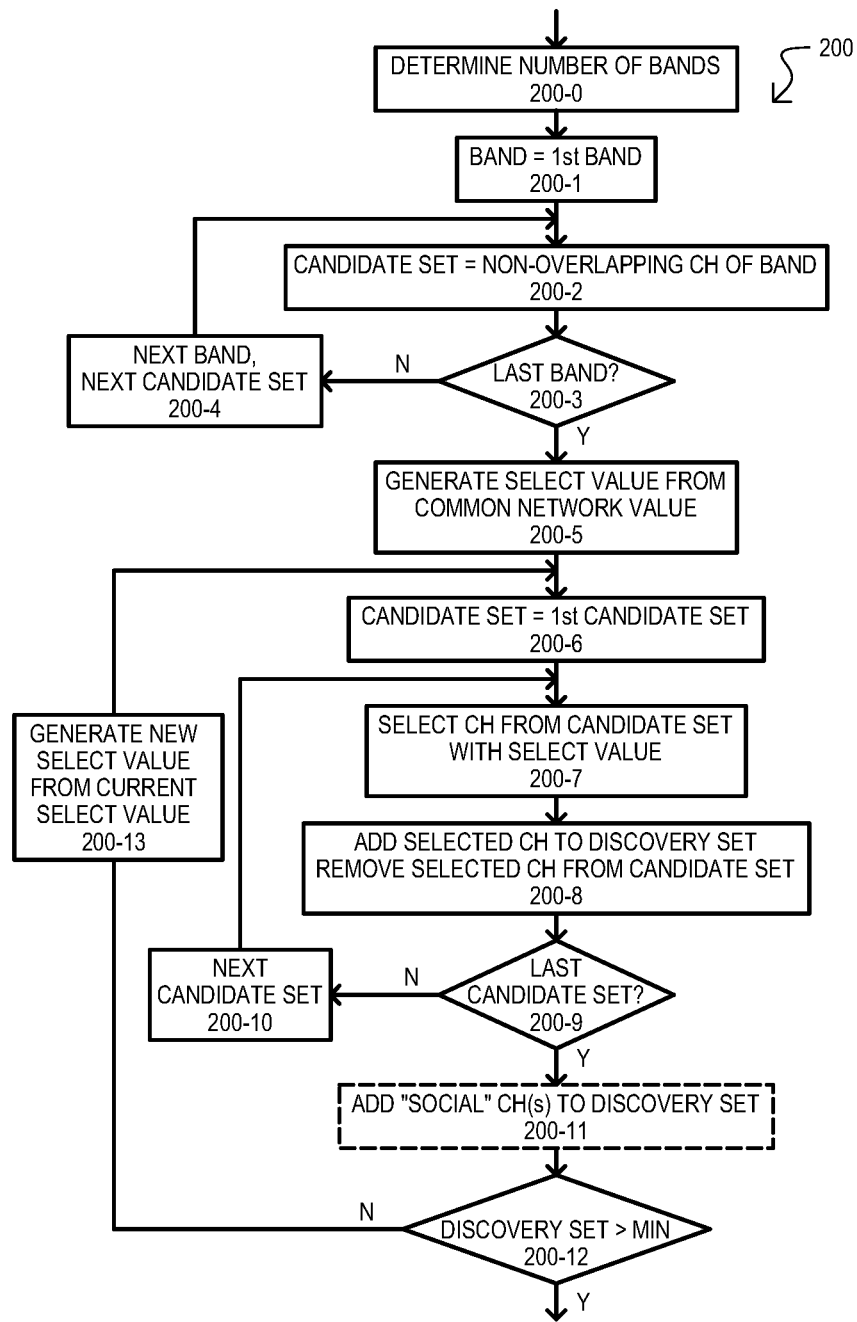
FIG. 2 is a flow diagram of method of computing discovery channels according to an embodiment.

FIG. 2 is a flow diagram of a method 200 according to another embodiment. A method 200 can generate a discovery channel set for use in discovery operations. A method 200 can include determining a number of bands 200-0. Such an action can include determining a number of bands in which operations are expected to occur. In some embodiments, such an action can include considering the ISM 2.4 GHZ, 5 GHZ and 6 GHz band. Starting with a first band 200-1 a method 200 can form a candidate set by selecting non-overlapping channels 200-2 for each band (Y from 200-3, 200-4). In some embodiments, channels can be excluded from a candidate set for any suitable reasons, including but not limited to: channel quality, the use of all or part of channel by another wireless circuit or device operating according to a different communication standard or private or public restrictions on available channels.

Once candidate sets have been created for all bands (Y from 200-3), a method 200 can generate a select value from a common network value 200-5. As noted herein, such a value can be any suitable value stored or accessible by all devices executing a same discovery protocol. In some embodiments, a common network value can include a service name. In other embodiments, a common network value can include a bootstrapping public key.

Starting with a first candidate set 200-6, a method 200 can select one or more channels from the candidate set using a select value 200-7. In some embodiments, such an action can include normalizing the range of possible select values to the range of possible channels in the candidate set. A selected channel can be added to a discovery channel set and removed from its candidate set 200-8. Such an action can continue (N from 200-9, 200-10) until channels have been selected from all candidate sets.

Optionally, once channels have been selected from all candidate sets (and thus from all bands of interest) (Y from 200-9), a method 200 can add social channels to a discovery set 200-11. Such an action can ensure compatibility with conventional devices that limit discovery operations to assigned channels.

A method 200 can determine if a discovery set of channels is greater than a minimum value 200-12. A minimum value can be predetermined, selected according to operating conditions and/or can change according to operating conditions. In some embodiments, a minimum value can be different for each band (i.e., there must be some minimum number of candidate values for each band). If a number of channels in a discovery set is below a minimum, a method 200 can generate a new select value 200-13. In some embodiments, such an action can include executing a same arithmetic-logic function on the current select value (as opposed to the common network value). In some embodiments, this can include generating a hash chain, where each hashed value in the chain can be used to select channels from candidate sets. In some embodiments, if a discovery set includes a minimum number of channels in a band, that band can be excluded in a next pass.

In this way, wireless devices compute channels for use in discovery operations by selecting from non-overlapping channels of more than one band. Such a selection can include a computation on a common network value available to all devices of the discovery operation.

Figure 3:
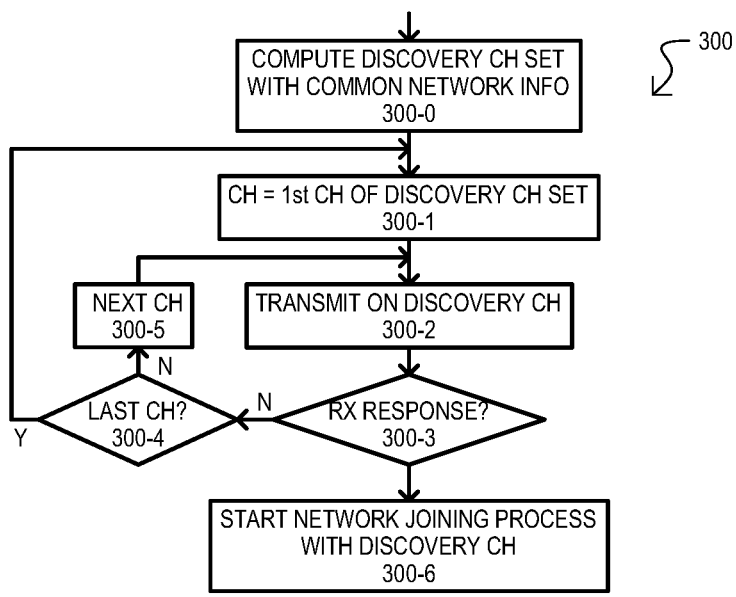
FIG. 3 is a flow diagram of a method according to another embodiment.

FIG. 3 is a flow diagram of a method 300 according to an embodiment. A method 300 can be executed by a device that indicates the presence of a network for discovery (e.g., publisher, initiator, configurator, advertiser), and can include computing a discovery channel set with common network information 300-0. Such an action can include any of those described herein or equivalents and is in contrast to conventional approaches in which devices are assigned "social" or other predetermined channels.

A method 300 can include, starting with a first channel of a discovery channel set 300-1, transmitting on each discovery channel (300-2, N from 300-3, 300-4, 300-5) until a response is received. Once a response is received (Y from 300-3), a method 300 can start a network joining process according to a predetermined protocol 300-6.

In this way, a device can indicate the presence of a network by transmitting on channels derived from a computation on a network information value available to devices of the network, and devices seeking to find the network.

Figure 4:
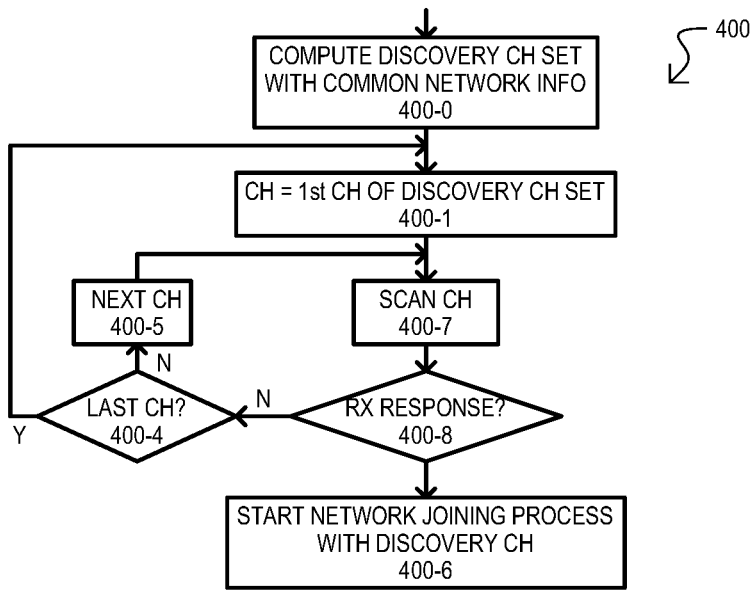
FIG. 4 is a flow diagram of a method according to a further embodiment.

FIG. 4 is a flow diagram of a method 400 according to another embodiment. A method 400 can be executed by a device that seeks to discover a network (e.g., subscriber, responder, enrollee, scanner), and can include the same general steps as shown in FIG. 3, and such like steps are shown with the same reference character but with the leading digit being a "4" instead of "3".

FIG. 4 differs from FIG. 3 in that computed channels can be scanned 400-7, and when a discovery message is detected on such a channel (Y from 400-8), a method 400 can start a network joining process 400-6.

In this way, a device seeking to discover a wireless network can receive transmissions on channels derived from a computation on a network information value available to devices of the network.

Figure 5:
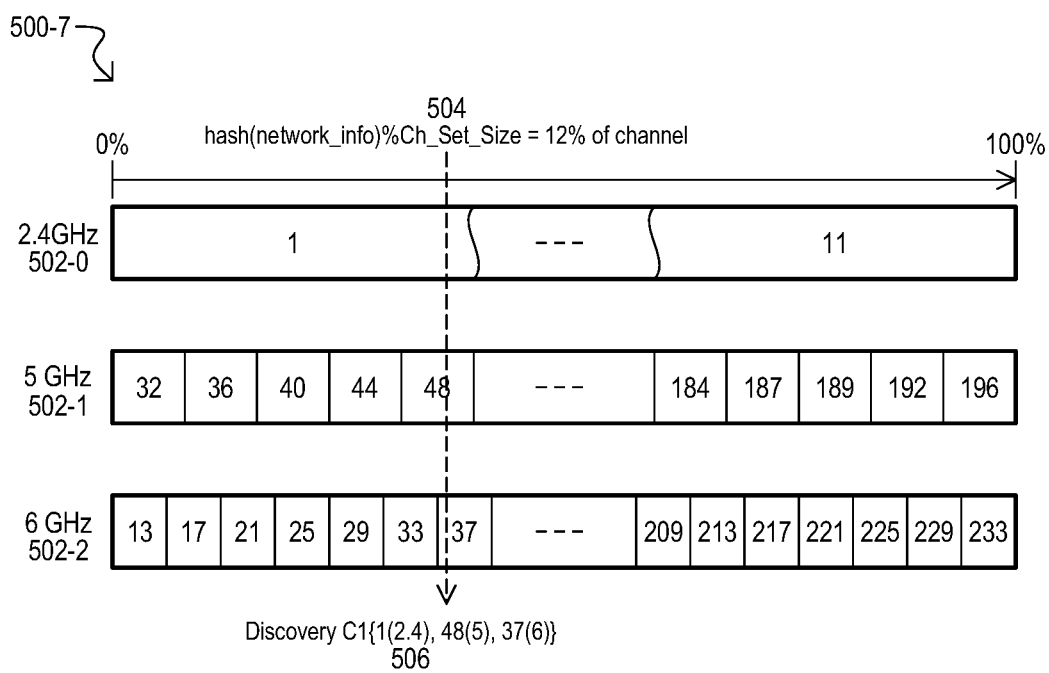
FIG. 5 is a diagram showing selection of discovery channels according to an embodiment.

FIG. 5 is a diagram showing a discovery channel selection operation according to an embodiment. FIG. 5 shows the selection of discovery channels for a wireless system compatible with one or more IEEE 802.11 wireless standards. FIG. 5 shows a candidate channel set 502-0, corresponding to a 2.4 GHz band, a candidate channel set 502-1, corresponding to a 5 GHz band and a candidate channel set 502-2, corresponding to a 6 GHz band. Each channel set 502-0/1/2 can be composed of non-overlapping channels within the band.

FIG. 5 shows the selection of one channel from each candidate channel set (502-0/1/2). An arithmetic-logic function can operate on a common network information value to arrive at a selection value 504. In the embodiment shown, a function can be a hash function operating on a network information value, normalized as a percent value across a channel set size. A network information value can include any of those described herein, including but not limited to a service name or bootstrapping public key.

FIG. 5 shows an example that arrives at a "12%" of candidate channel set value, which can select channel 1 from set 502-0, channel 48 from set 502-1 and channel 37 from set 502-2. Such channels can be added to a discovery channel set 506. As understood from embodiments herein, the resulting hash value can itself be hashed with the same hash function in the event another channel is selected from a candidate set (e.g., the candidate set is too small).

In this way, a hashed value can be normalized the size of a candidate channel set to select a channel as a discovery channel.

Figure 6:
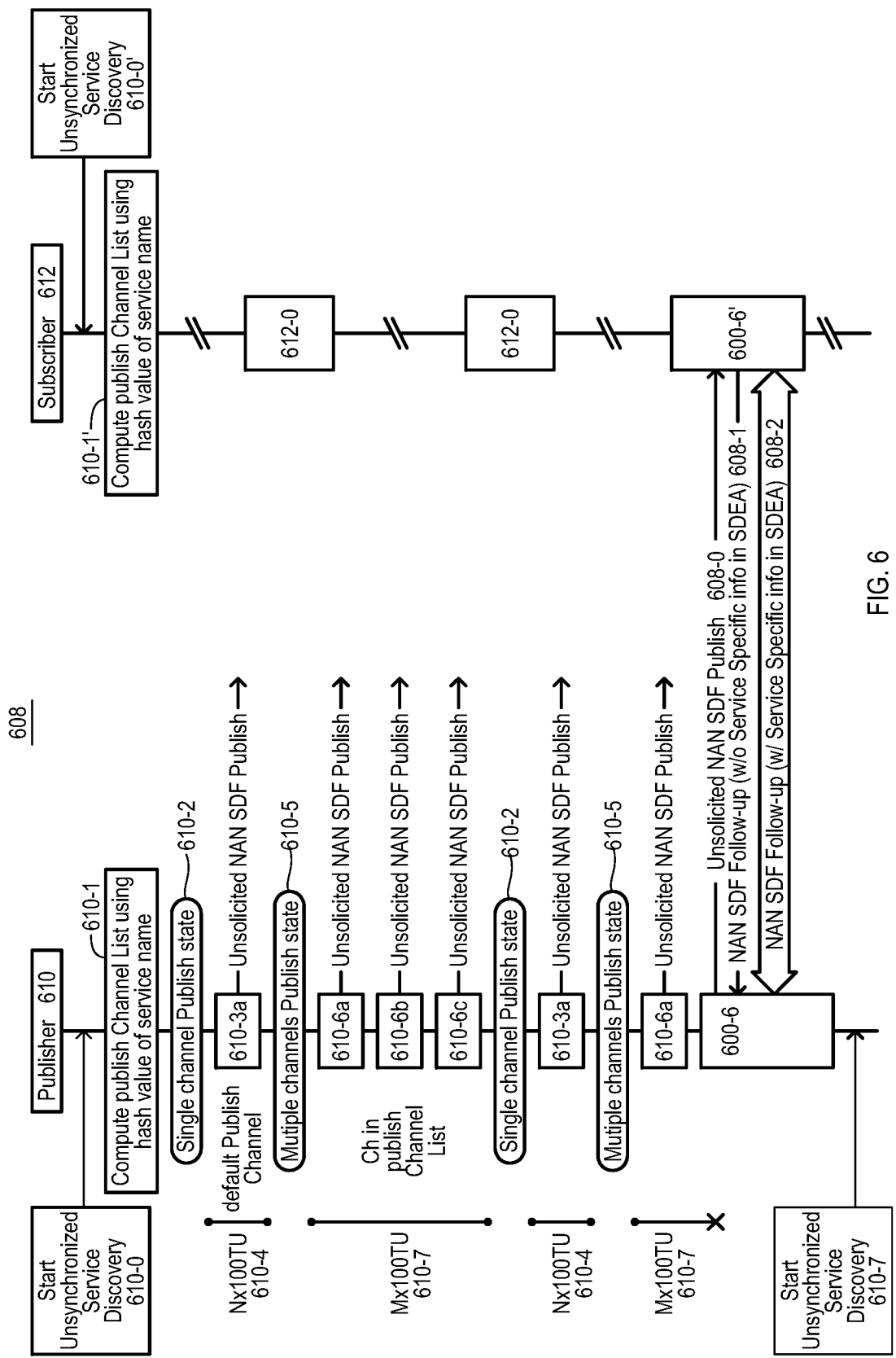
FIG. 6 is a timing diagram showing a discovery operation according to an embodiment.

FIG. 6 is a communication diagram showing a discovery operation 608 according to an embodiment. An operation 608 can include communications between a device operating as a publisher 610 and a device operating as a subscriber 612. An operation 608 can be a matter commissioning protocol over unsynchronized service discovery frames.

An operation 608 can include both a publisher 610 and a subscriber 612 entering an unsynchronized service discovery operation 610-0/0'. Such an action can be automatic, according to the operation of a device 610/612 and/or started by a device user or device application. A publisher and subscriber 610/612 can compute a channel list using a same hash value 610-1/1' as described for embodiments herein or equivalents. In the embodiment shown, a network information value that is hashed can be a service name for the network.

In an embodiment, a set C1={Channel 1, 6, 11} can be designated as a set of non-overlapping 20 MHz Wi-Fi channels on 2.4 GHz band worldwide. A set C2={Channel 32, 36, 40, . . . } can be designated as the set of non-overlapping 20 MHz Wi-Fi channels on 5 GHz band worldwide, and so on for any other bands, such as a 6 GHz for C3.

A publisher (e.g., matter commissionee device) 610 can choose one channel per band from the sets (e.g., C1, C2, . . . ) based on the functions hash(service name) % sizeof(C1), hash(service name) % sizeof(C2), etc. These channels can form operating channels (i.e., a discovery channel set) for the publisher 610, which can be denoted as Cd. A publisher 610 can device add social channels (e.g., channel 6, 44, or 149) to Cd if they have not been chosen into Cd based on hash values. This can enable backward compatibility with existing standards using such social channels.

If needed, more channels can be added to Cd. These channels can be chosen from C1, C2, . . . based on the hash value of the previously calculated hash value such as hash (hash(service name))% sizeof(C1), hash(hash(service name))% sizeof(C2), . . . . This operation can repeat until sizeof(Cd) reaches a specified number.

A publisher 610 can enter a single channel publish state 610-2. In such a state, a publisher 610 can transmit discovery messages on one channel from the computed discovery channel set. In some embodiments, the one channel can be a social channel. In the embodiment shown, this can include transmitting unsolicited NAN (Neighbor Aware Network-ing) SDF (Service Discovery Frame) 610-3a on a default publishing channel. Such NAN SDFs can be transmitted over a random period of time, which can be N×100 TU, where N is a randomly selected integer between 5 and 10, and TU is a time unit of the system (e.g., 1024 us).

A publisher 610 can enter a multiple channels publish state 610-5. In such a state, a publisher 610 can transmit discovery messages over multiple channels, which can be selected from the discovery channel set. Such transmissions can also be unsolicited NAN SDFs 610-6a/b/c. Such frames can be transmitted repeatedly on every channel over a random period of time, which can be M×100 TU, where M is also an integer that is randomly selected from between 5 and 10 for each different channel. In some embodiments, transmissions on a channel can have a minimum duration (e.g., M*100/sizeof(Cd)>=100 ms).

A publisher 610 can alternate between a single channel publishing state 610-2 and multiple channels publish state 610-3 until a response is detected from a subscriber 612.

In some embodiments, a subscriber (e.g., matter commissioner device) 612 can do the same calculation from the service name, thus creating the same operating channel set Cd. It can then scan every channel in Cd for NAN SDF Publish messages sent by the publisher 610. Alternatively, a subscriber can proactively broadcast NAN SDF (service discovery frame) subscribe messages repeatedly on every channel in Cd using the same timing specified by an unsynchronized service discovery spec.

After computing a publish channel list 610-1', a subscriber 612 can periodically scan for service discovery messages 612-0 using such a list. Due to the publishing periods (610-4/610-7), a subscriber 612 can eventually detect a discovery message on one of the channels, and a discovery operation can be completed 600-6/600-6'.

In some embodiments, once a subscriber 612 receives a NAN SDF Publish message containing the same hash(service name) value, it can send a NAN SDF Follow-up message without Service Specific Info in SDEA (Service Descriptor Extension attribute) 608-1 to the publisher 610, signaling it wants to start service discovery protocol.

In some embodiments, after the publisher 610 receives a NAN SDF follow-up message without Service Specific Info in SDEA 608-1 (or a NAN SDF Subscribe message with the same hash(service name) value), it can start communicating with the subscriber 612 using a NAN SDF Follow-up message with Service Specific Info in SDEA 608-2, which carry a matter commissioning protocol.

In this way, an unsynchronized discovery service can use channels commonly computed by publishing and subscribing devices.

Figure 7:
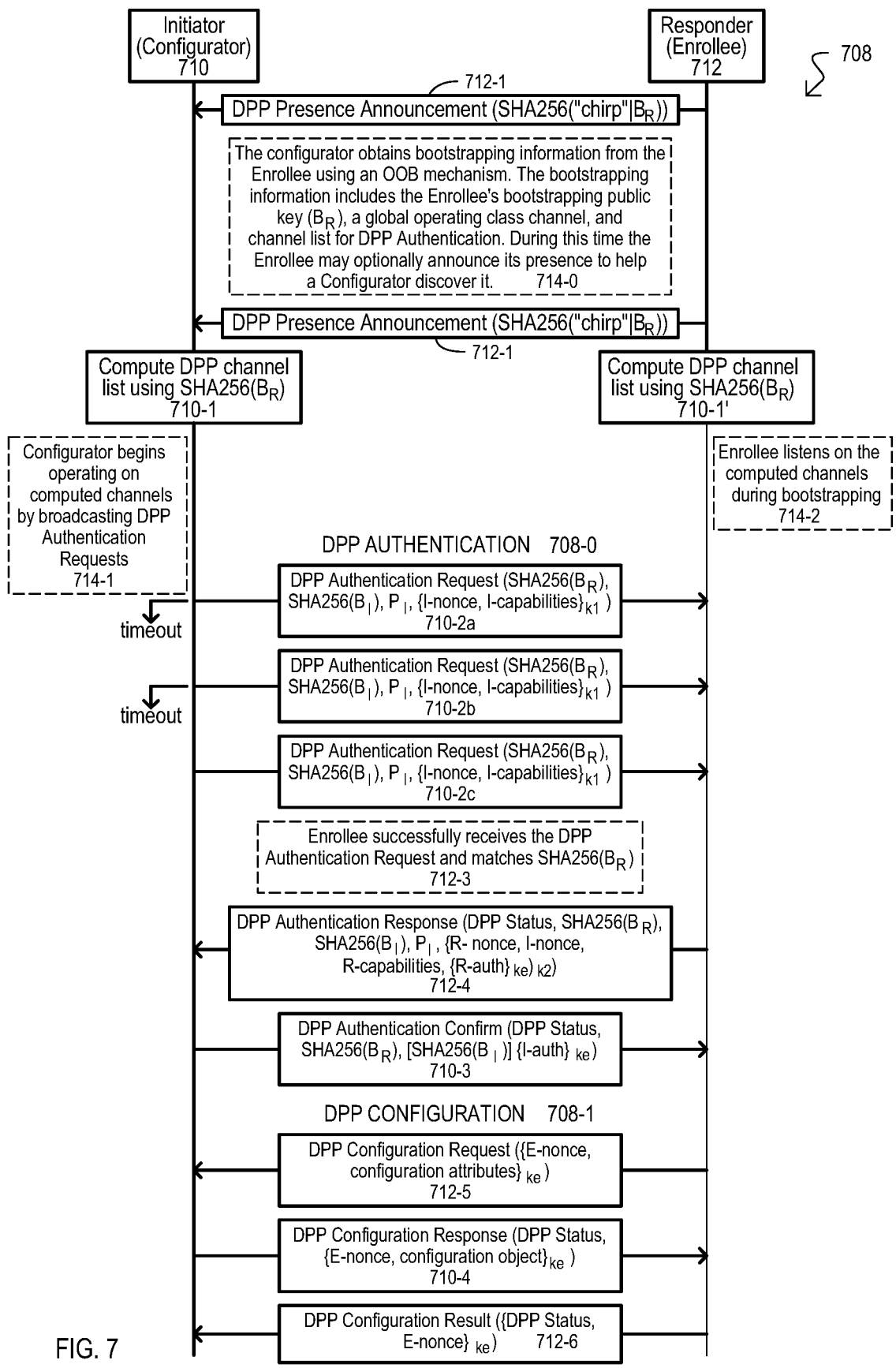
FIG. 7 is a timing diagram showing a discovery operation according to another embodiment.

FIG. 7 is a communication diagram showing a discovery operation 708 according to an embodiment. An operation 708 can include communications between a device operating as a configurator (e.g., initiator) 710 and a device operating as an enrollee (e.g., responder) 712. An operation 708 can be a DPP (Device Provisioning Protocol) with enrollee presence announcement and can include DPP authentication 708-0 followed by DPP configuration 708-1.

An operation 708 can include some mechanism 714-0 for a configurator 710 and enrollee 712 to determine a common network value. In some embodiments, this can include an OOB (Out-of-Band) mechanism the provides bootstrapping information, including a bootstrapping public key ($B_R$) for the enrollee. An OOB mechanism can include any suitable mechanism, including but not limited to: receiving data from the scanning of a code (e.g., QR code, NFC tag reading) or receiving data via another protocol (e.g., Bluetooth transmission). In some embodiments, while OOB communication is occurring, an enrollee can announce is presence with an announcement transmission (e.g., SHA256("chirp"|$B_R$)), where chirp is a string value.

A configurator and enrollee 710/712 can compute a channel list using a same hash value 710-1/1' as described for embodiments herein or equivalents. In the embodiment shown, a hash function can be a secure hash algorithm SHA256 function that operates on the $B_R$ value. In an embodiment, sets of candidate channels can be designated as described for FIG. 6 (i.e., a set C1 for a 2.4 GHz band, a set C2 for a 5 GHz band, a set C3 for a 6 GHz band).

In an embodiment, an enrollee 712 can choose one channel per band from C1, C2, etc., based on SHA256($B_R$) % sizeof(C1), SHA256($B_R$) % sizeof(C2), etc. These channels can form operating channels for an enrollee 712, which can be denoted as Cd. As described for other embodiments, an enrollee 712 can add social channels (e.g., channels 6, 44, or 149) to Cd if they have not been chosen into using the SHA256 operation. This can be for backward compatibility for any existing DPP specification using social channels. If needed, more channels can be added to Cd. These channels can be chosen from C1, C2, . . . based on the hash value of the previously calculated hash value, such as SHA256 (SHA256($B_R$))% sizeof(C1), SHA256(SHA256($B_R$))% sizeof(C2), etc. This operation can repeat until a size of Cd reaches a specified number.

A configurator 710 can do a same calculation using the enrollee's bootstrapping public key, thus creating a same Cd. A configurator 710 can scan every channel in Cd for enrollee presence announcement messages sent by the enrollee 712. Alternatively, a configurator 710 can proactively broadcast DPP authentication requests (if enrollee's MAC address is not in its bootstrapping information) or send such requests (if enrollee's MAC address is known) (e.g., 710-2a/b/c). Such requests can be broadcast/sent on every channel in Cd. In some embodiments, the timing of such broadcasts/requests can use the timing of a DPP specification (e.g., 5 seconds per channel).

FIG. 7 shows DPP authentication requests 710-2a/b/c that can be broadcast or transmitted. While such requests can take any suitable form, in FIG. 7 they can follow a Wi-Fi Alliance DPP format of: SHA256($B_R$), SHA256($B_I$), $P_I$, {I-nonce, I-capabilities}$_{k1}$, where $B_i$ is a configurators public key, $P_I$ is a configurator protocol key, I-nonce is a configurator generated nonce value, I-capabilities can indicate capabilities of the configurator and k1 can be a (HKDF) generated key.

In some embodiments, an enrollee 712 can broadcast enrollee presence announcement messages on every channel in Cd. Such messaging can use the same timing as a DPP specification (e.g., 2 minutes per channel).

Once an enrollee 712 successfully receives a DPP authentication request including matching a hashed value (e.g., SHA256($B_R$), the enrollee 712 can transmit a DPP authentication response 712-4. While a response can take any suitable form, it can follow a Wi-Fi Alliance DPP format of: DPP status, SHA256($B_R$), [SHA256($B_I$),] PR, {R-nonce, I-nonce, R-capabilities, {R-auth}$_{ke}$}$_{k1}$, where PR is an enrollee protocol and ke a generated key.

In response to a DPP authentication response, a configurator 710 can transmit a DPP authentication confirmation 710-3. While such response can take any suitable form, it can follow a Wi-Fi Alliance DPP format of: DPP status, SHA256($B_R$), [SHA256($B_I$),] {I-auth}$_{ke}$, where I-auth is an authenticating tag.

A DPP configuration 708-1 can include an enrollee issuing a DPP configuration request 712-5. While a configuration request can take any suitable form, in FIG. 7 it can follow a Wi-Fi Alliance DPP format of: {E-nonce, configuration attributes}$_{ke}$. Where E-nonce is a nonce value generated by a responder. In response, a configurator 710 can issue a DPP configuration response 710-4, which in the embodiment shown, can take the form of: DPP status, {E-nonce, configuration object}$_{ke}$. An enrollee 708 can return with a DPP configuration result 712-6, which in the embodiment shown, can take the form of: DPP status, E-nonce.

In this way, a DPP protocol can use hash operations on a public key to generate channels for initiating DPP authentication.

Figure 8:
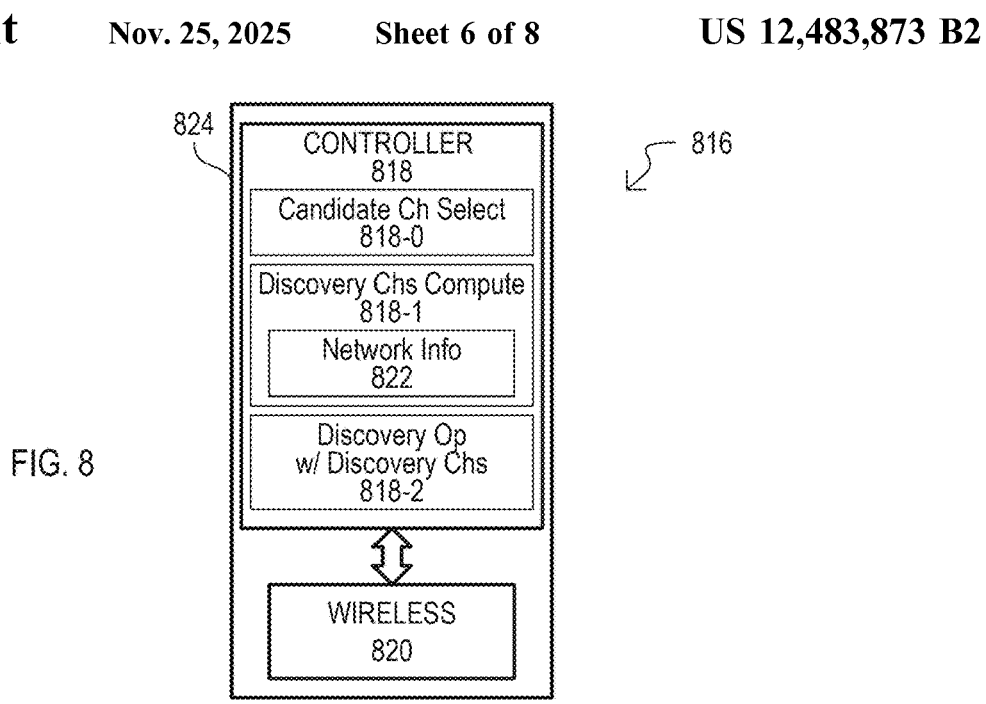
FIG. 8 is a block diagram of a wireless device according to an embodiment.

While embodiments can include various operations and methods described herein, embodiments can also include devices that execute such methods and operations. FIG. 8 is a block diagram of a device 816 according to an embodiment. A device 816 can include controller circuits 818 and wireless circuits 820. Controller circuits 870 can include processor and/or logic circuits for executing the various wireless discovery operations described herein, including but are not limited to: one or more processors with corresponding memory, custom logic, programmable logic, or combinations thereof.

Controller circuits 818 can include candidate channel selection circuits 818-0, discovery channel computation circuits 818-1 and discovery operation circuits 818-2. Candidate selection circuits 818-0 can select candidate channels from available channels of operating bands, as described herein and equivalents. Discovery computation circuits 818-1 can execute one or more arithmetic-logic operations that include network information 822 to arrive at discovery channels, as described herein and equivalents. Discovery operation circuits 818-2 can execute discovery protocols using a set of discovery channels generated through computation operations. Wireless circuits 820 can transmit and receive according to any suitable wireless standard, including public and/or private standards.

In some embodiments a device 816 can be formed with a same integrated circuit substrate 824. A device 816 can be a device that transmits on discovery channels that enables the joining of a network and/or a device that monitors discovery channels in an attempts find and join a network.

In this way a wireless device can include circuits for generating channels for discovery operations via a computation operation on network information common to devices of the network.

Figure 9:
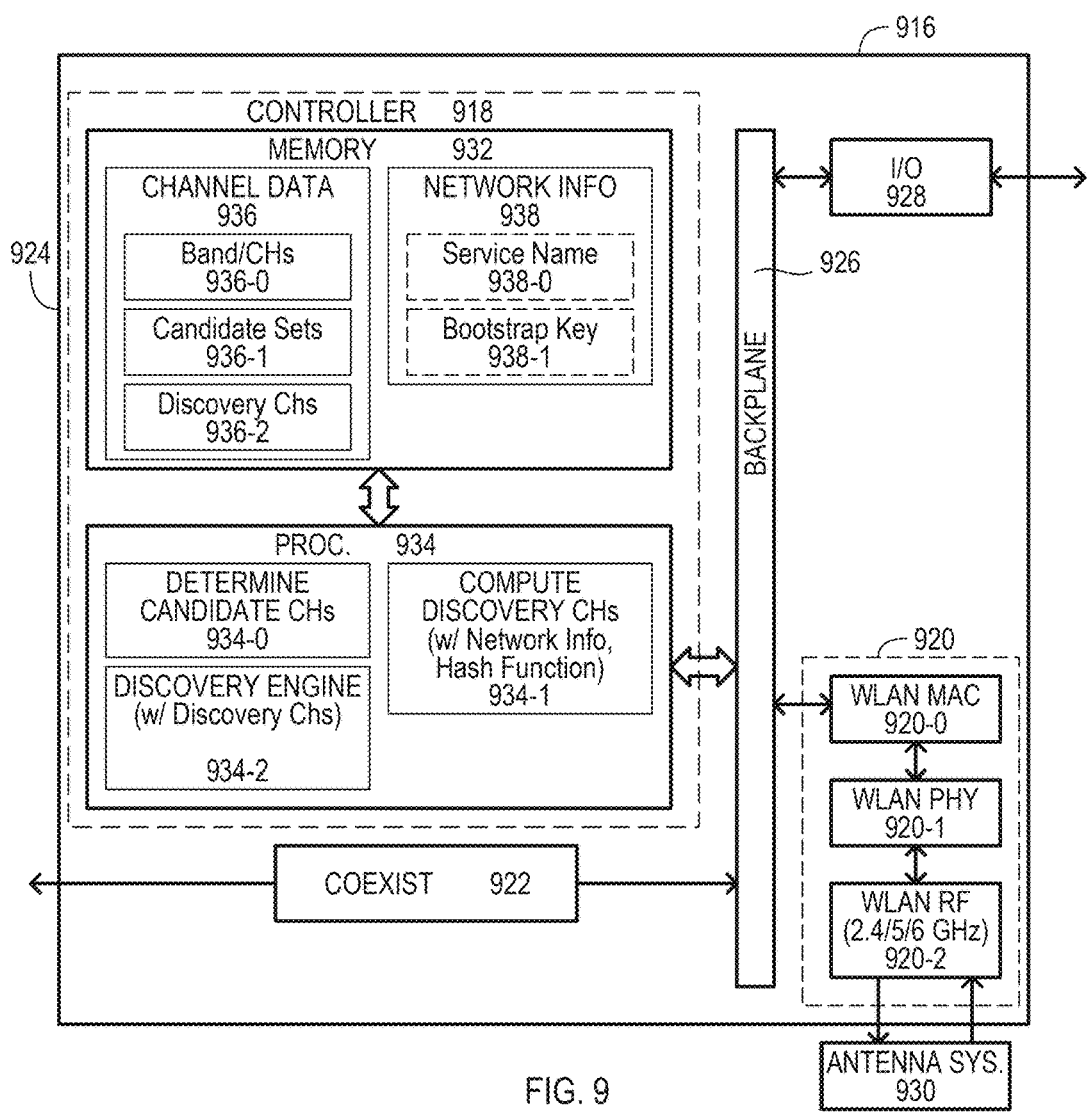
FIG. 9 is a block diagram of wireless device according to another embodiment.

FIG. 9 shows a device 916 according to another embodiment. A device 916 can include controller circuits 918, wireless circuits 920, input/output (IO) circuits 928 in communication with one another over a communications network (e.g., backplane) 926. Optionally, a device 916 can include coexistence circuits 922. Controller circuits 918 can include a memory system 932 and processor circuits 934.

A memory system 932 can include channel data 936 and network information 938. Channel data 936 can include band/channel data 936-0, candidate set data 926-1 and discovery channel data 936-2. Band/channel data 936-0 can include channel data for multiple bands, and in some embodiments can identify channels in the 2.4 GHz, 5 GHZ and/or 6 GHz that are compatible with one or more IEEE 802.11 wireless standards. Candidate set data 926-1 can include channel data by selecting from available channels, and in some embodiments, can be non-overlapping channels within bands. Discovery channel data 936-2 can be channels selected by a computation operation that uses network information 938, as described herein and equivalents. Network information 938 can include any suitable data known or available to devices in, or seeking to join, a network. Network information 938 can include, but is not limited to, a service name 938-0 or a public bootstrapping key 938-1.

Processor circuits 934 can include one or more processors that can execute code stored in memory system 932 to provide various functions for the device 916. Such functions can include but are not limited to: determining candidate channels 934-0, computing discovery channels 934-1 and a discovery engine 934-2. Such functions and operations can include any of the corresponding operations described herein, or equivalents. In some embodiments, determining candidate channels 934-0 can include determining non-overlapping channels in the 2.4 GHZ, 5 GHZ and 6 GHz bands. Computing discovery channels 934-1 can include executing a hash function on network info 822 and normalizing the result to set size to select from candidate channel sets. Such a hash function can be dedicated to a discovery channel selection operation or can be a hash function already available on the device 916 (e.g., SHA256).

Wireless circuits 920 can provide wireless communications compatible with one or more IEEE 802.11 wireless standards. Wireless circuits 920 can include a MAC layer circuits 920-0, physical layer (PHY) circuits 920-1 and RF circuits 920-2. Wireless circuits 920 can enable the transmission of communications compatible with one or more IEEE 802.11 standards, on any suitable band, including but not limited to the 2.4 GHz, 5 GHz and/or 6 GHz band.

IO circuits 928 can enable control of a device 916 from sources external to the device. IO circuits 928 can enable communication with the device according to any suitable fashion. In some embodiments, IO circuits 928 can include serial communication circuits, including but not limited to: serial digital interface (SDI), universal serial bus (USB), universal asynchronous receiver transmitter (UART), I2C, or I2S. Coexistence circuits 922 can enable communications between wireless circuits 920 and other wireless circuits, such as Bluetooth circuits (not shown). Such other wireless circuits can be part of the same device 916 or can be a separate device.

In some embodiments circuits of a device 916 can be formed with a same integrated circuit substrate 924. A device 916 can operate in conjunction with an antenna system 930 having one or more antennas compatible with one or more IEEE 802.11 wireless standards.

In this way, a wireless device compatible with IEEE 802.11 wireless standards can generate channels for discovery operations by a computation operation, and thus can include more or different channels than those that may be dictated by a standard (i.e., default social channels).

Figure 10:
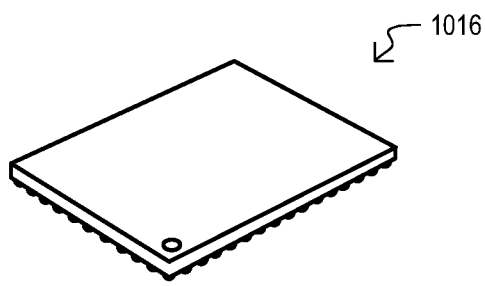
FIG. 10 is a diagram of an integrated circuit device according to an embodiment.

While embodiments can include devices and systems with various interconnected components, embodiments can also include unitary devices which can execute configurator and/or target device functions as described herein. In some embodiments, such unitary devices can be advantageously compact single integrated circuits (i.e., chips). FIG. 10 shows a packaged single chip device 1016, which can compute a discovery channel set as described herein and equivalents. It is understood a same computation can be performed by other devices in the discovery operation to enable devices to operate according to a common set of channels used in a discovery channel. A device according to embodiments can include any other suitable integrated circuit packaging type, as well as direct bonding of a device chip onto a circuit board or substrate.

In this way, a wireless integrated circuit device can enable discovery operations to be distributed over any of a number of channels, rather than be limited to a set of "social" channels.

Figure 11:
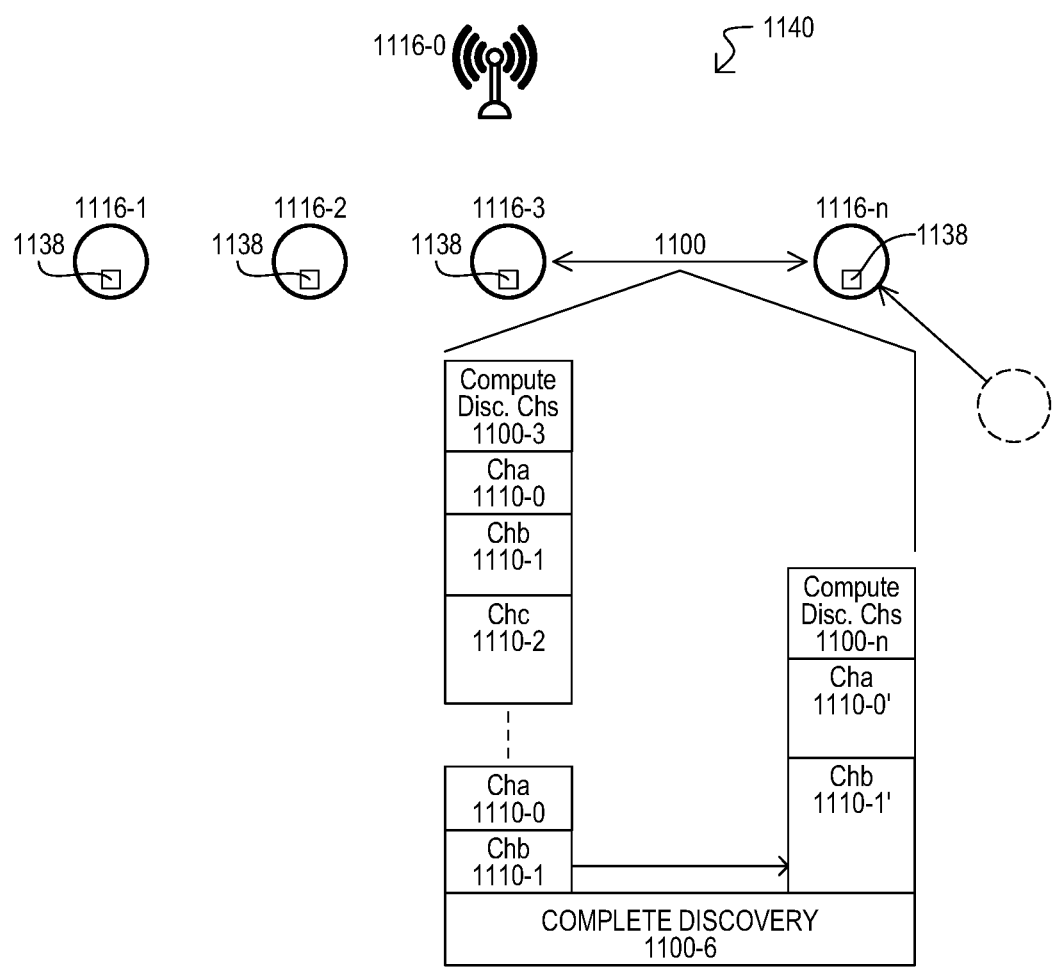
FIG. 11 is a diagram of a system according to an embodiment.

FIG. 11 is a diagram of a system 1140 according to an embodiment. A system 1140 can include a number of wireless devices 1116-0 to 1116-3. In some embodiments, a system 1140 can be a Wi-Fi compatible system, with one device being an access point device (e.g., 1116-0). Devices (1116-0 to -3) can each include, or have access to, a common network information value 1138. As noted herein, common network information value can be a service name and/or can be a bootstrapping key that can be accessed when a device joins a network.

FIG. 11 shows a system 1140 when a new device 1116-*n* seeks to discover and join the system 1140. Device 1116-3 can enable new device 1116-*n* to join a network for any of a number of reasons (e.g., proximity, transmission/reception ability, configuration). In some embodiments, network information value 1138 can be known prior to the arrival of a new device 1116-*n*, and device 1116-3 can have previously started a discovery operation, including computing discovery channels 1100-3 using network information value 1138. In other embodiments, an operation (e.g., OOB bootstrapping) can result in a network information value 1138 being known to both devices 1116-3 and 1116-*n*.

Device 1116-3 can begin transmitting discovery communications on discovery channels 1110-0 to -2. According to embodiments, such transmissions can vary with each iteration (e.g., in duration or in order). As it seeks to join the network, new device 1116-*n* can itself compute discovery channels 1100-*n* using network information value 1138 and begin monitoring for transmissions on such discovery channels 1110-0'/1'. According to embodiments, such monitoring for transmissions can also vary with each iteration. In this way, a new device 1116-*n* can eventually receive a discovery communication 1142, and the two devices 116-3 and 116-*n* can complete a discovery/network joining operation 1100-6.

In this way, devices of a system can periodically execute discovery operations and/or execute discovery operations in response to other events, where discovery operations can start with computed discovery channels as described herein or equivalents.

Figure 12:
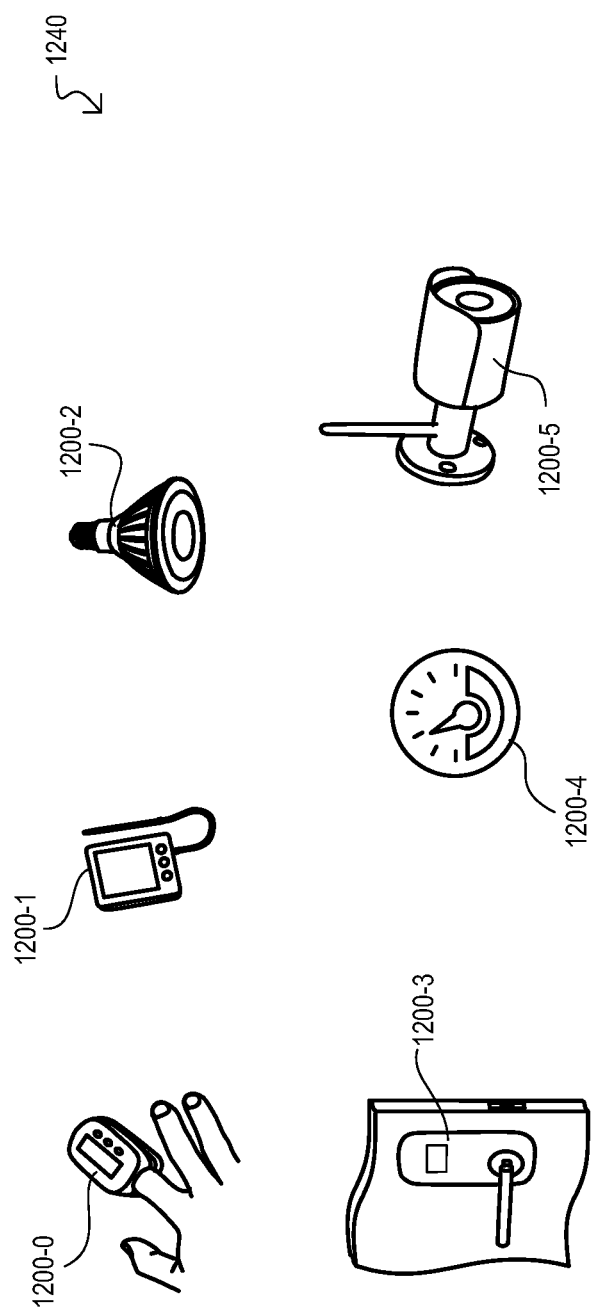
FIG. 12 is a diagram showing Internet-of-Things (IoT) devices according to embodiments.

While embodiments can include single integrated circuit devices, embodiments can include larger devices which can improve the performance of coexisting radio circuits the share the same medium. FIG. 12 shows various such devices according to embodiments. Such devices can include circuits capable of executing discovery operations as described herein, or equivalents, including the computation of channels used in a discovery operation using commonly known network information values.

In some embodiments, systems can include Internet-of-things (IoT) type devices, that are wireless capable, including but not limited to: medical devices 1200-0/1, lighting devices 1200-2, access devices 1200-3, instrumentation devices 1200-4 and security devices 1200-5. In some embodiments, such devices (1200-0 to -5) can be quickly added to networks without crowding social networks.

In this way, embodiments can include IoT type devices.

Embodiments can advantageously relieve channel congestion on social channels dedicated to discovery protocols. This can enable new wireless devices to be onboarded to systems faster. At the same time, the inclusion of social channels in a discovery channel set can enable devices to remain backward compatible with those that limits discovery to social channels.

Embodiments can include methods, devices and systems that can determine at least one set of wireless channel candidates from available wireless channels of a wireless network; determine a network information value accessible to devices of the wireless system; generate a selection value with an arithmetic-logic operation on the network information value; select a plurality of wireless channels from the at least one set of wireless channel candidates with the selection value to determine a discovery wireless channel set; and transmit or receive on all channels of the discovery wireless channel set in a wireless network discovery operation for the wireless network.

Embodiments can include methods, devices and systems that can include wireless circuits configured to communicate according to at least one wireless communication protocol as well as controller circuits. Controller circuits can determine candidate channels of one or more bands of a wireless communication protocol, generate a selection value by executing at least one arithmetic-logic operation with a network information value, determine a set of discovery channels by selecting channels from the candidate channels with the selection value, and transmit or receive on all channels of the set of discovery channels in a wireless discovery operation for a wireless network. Memory circuits can be included that are configured to store at least the network information value and the set of discovery channels. The network information value can be a value available to all devices of the discovery operation.

Embodiments can include methods, devices and systems having a first wireless device configured to determine candidate channels of at a least one band, the channels of the at least one band being determined by at least one wireless communication protocol. The wireless device can also generate a selection value by executing at least one arithmetic-logic operation on a network information value, determine a set of discovery channels by selecting channels from the candidate channels with the selection value, and transmit or receive on all channels of the set of discovery channels in a wireless discovery operation for a wireless network. An antenna system can be included that is configured to transmit and receive on the at least one band.

Methods devices and systems according to embodiments can include the set of wireless channel candidates being wireless channels from a plurality of different bands.

Methods devices and systems according to embodiments can include the set of wireless channel candidates being non-overlapping wireless channels of a same band.

Methods devices and systems according to embodiments can include adding a plurality of social wireless channels to the discovery wireless channel set. The social wireless channels are wireless channels assigned for network discovery transmissions by at least one standard.

Methods devices and systems according to embodiments can include the arithmetic logic operation includes a hash function.

Methods devices and systems according to embodiments can include the wireless network discovery operation being compatible with a Wi-Fi Aware standard. The network information value can include a service name for the wireless network. Transmitting on all channels can include transmitting a NAN SDF. An NAN SDF can be a publishing message or a subscribe message.

Methods devices and systems according to embodiments can include the wireless network discovery operation being compatible with a DPP. The network information value can include a bootstrapping public key. The arithmetic-logic operation can include a SHA256 function. Transmitting on all channels can include transmitting a DPP message. A DPP message can be an enrollee presence announcement or an authentication request message.

Methods devices and systems according to embodiments can include wireless circuits are compatible with at least one IEEE 802.11 wireless standard.

Methods devices and systems according to embodiments can include wireless circuits, controller circuits and memory circuits formed in a same integrated circuit substrate.

Methods devices and systems according to embodiments can include a second wireless device configured to determine the candidate channels, generate the selection value by executing the at least one arithmetic-logic operation with the network information value, determine the set of discovery channels by selecting channels from the candidate channels with the selection value, and receiving on all channels of the set of discovery channels in the wireless discovery operation for a wireless network.

Methods devices and systems according to embodiments can include the at least one band including the ISM 2.5 GHz band and the ISM 5 GHz band.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
by operation of a wireless device,
determining at least one set of wireless channel candidates from available wireless channels of at least one wireless standard;
determining a network information value accessible to devices of a wireless network;
generating a selection value with an arithmetic-logic operation on the network information value;

selecting a plurality of wireless channels from the at least one set of wireless channel candidates with the selection value to determine a discovery wireless channel set; and transmitting or receiving on all channels of the discovery wireless channel set in a wireless network discovery operation for the wireless network.

2. The method of claim 1, wherein the set of wireless channel candidates includes wireless channels from a plurality of different bands.

3. The method of claim 1, wherein the set of wireless channel candidates includes non-overlapping wireless channels of a same band.

4. The method of claim 1, further including adding a plurality of social wireless channels to the discovery wireless channel set; wherein the social wireless channels are wireless channels assigned for network discovery operations by at least one standard.

5. The method of claim 1, wherein the arithmetic logic operation includes a hash function.

6. The method of claim 1, wherein:

the wireless network discovery operation is compatible with a Wi-Fi Aware standard;

the network information value includes a service name for the wireless network; and the transmitting on all channels of the discovery wireless channel set includes transmitting a neighbor awareness networking (NAN) service discovery frame (SDF); wherein the NAND SDF is selected from the group of: a NAN SDF publishing message and a NAN SDF subscribe message.

7. The method of claim 1, wherein:

the wireless network discovery operation is compatible with a device provisioning protocol (DPP);

the network information value includes a bootstrapping public key;

the arithmetic-logic operation includes a SHA256 function; and the transmitting on all channels of the discovery wireless channel set includes transmitting DPP message; wherein the DPP message is selected from the group of: a DPP enrollee presence announcement and a DPP authentication request message.

8. A device, comprising:

wireless circuits configured to communicate according to at least one wireless communication protocol;

controller circuits configured to determine candidate channels of at a least one band of the at least one wireless communication protocol, generate a selection value by executing at least one arithmetic-logic operation on a network information value, determine a set of discovery channels by selecting channels from the candidate channels with the selection value, and transmit or receive on all channels of the set of discovery channels in a wireless discovery operation for a wireless network; and memory circuits configured to store the network information value and the set of discovery channels; wherein the network information value is value accessible by all devices of the discovery operation.

9. The device of claim 8, wherein the wireless circuits are compatible with at least one IEEE 802.11 wireless standard.

10. The device of claim 8, wherein:

the controller circuits are configured to determine candidate channels from a plurality of different bands; wherein the candidate channels are non-overlapping.

11. The device of claim 8, wherein:

the wireless network discovery operation is compatible with a Wi-Fi Aware standard; and the network information value includes a service name for the wireless network; and the controller circuits are configured to transmit neighbor awareness networking (NAN) service discovery frames (SDF); wherein the NAND SDF is selected from the group of: a NAN SDF publishing message and a NAN SDF subscribe message.

12. The device of claim 8, wherein:

the wireless network discovery operation is compatible with dual provisioning protocol (DPP) of the Wi-Fi Alliance;

the network information value includes a bootstrapping public key;

the arithmetic-logic operation includes a SHA256 function; and the controller circuits are configured to transmit at least one DPP message; wherein the DPP message is selected from the group of: a DPP enrollee presence announcement and a DPP authentication request message.

13. The device of claim 8, wherein:

the controller circuit is further configured to add a plurality of social wireless channels to the discovery wireless channel set; wherein the social wireless channels are wireless channels assigned for network discovery transmissions according to the at least one wireless communication protocol.

14. The device of claim 8, wherein the wireless circuits, the controller circuits and memory circuits are formed in a same integrated circuit substrate.

15. A system, comprising:

a first wireless device configured to determine candidate channels from channels of at a least one band, the channels of the at least one band determined by at least one wireless communication protocol, generate a selection value by executing at least one arithmetic-logic operation on a network information value, determine a set of discovery channels by selecting channels from the candidate channels with the selection value, and transmit or receive on all channels of the set of discovery channels in a wireless discovery operation for a wireless network; and an antenna system configured to transmit and receive on the at least one band.

16. The system of claim 15, further including:

the first wireless device is configured to transmit on all the channels of the set of discovery channels in the wireless discovery operation; and a second wireless device configured to determine the candidate channels, generate the selection value by executing the at least one arithmetic-logic operation on the network information value, determine the set of discovery channels by selecting channels from the candidate channels with the selection value, and receive on all channels of the set of discovery channels in the wireless discovery operation.

17. The system of claim 15, wherein the at least one band includes the ISM 2.5 GHz band and the ISM 5 GHz band.

18. The system of claim 15, wherein the candidate channels are non-overlapping channels.

19. The system of claim 15, wherein:
the wireless network discovery operation is compatible with the Wi-Fi Aware standard; and
the network information value includes a service name for the wireless network; and
the first wireless device is configured to transmit neighbor awareness networking (NAN) service discovery frames (SDF); wherein
the NAND SDF is selected from the group of: a NAN SDF publishing message and a NAN SDF subscribe message.

20. The system of claim 15, wherein:
the wireless network discovery operation is compatible with a dual provisioning protocol (DPP);
the network information value includes a bootstrapping public key,
the arithmetic logic function includes a SHA256 function; and
the first wireless device is configured to transmit at least one DPP message; wherein
the DPP message is selected from the group of: a DPP enrollee presence announcement and a DPP authentication request message.

* * * * *